United States Patent
Cummins et al.

(10) Patent No.: US 10,671,996 B2
(45) Date of Patent: Jun. 2, 2020

(54) SYSTEMS AND METHODS FOR PROVIDING PRE-PAID MULTICARDS

(71) Applicant: The Toronto-Dominion Bank, Toronto (CA)

(72) Inventors: Michael D. Cummins, Pickering (CA); Lauren Van Heerden, Bedford, NH (US); Prabaharan Sivashanmugam, Farmington Hills, MI (US); Orin Del Vecchio, Richmond Hill (CA); Gunalan Nadarajah, Milton (CA)

(73) Assignee: The Toronto-Dominion Bank, Toronto (CA)

( * ) Notice: Subject to any disclaimer, the term of this patent is extended or adjusted under 35 U.S.C. 154(b) by 913 days.

(21) Appl. No.: 14/796,450

(22) Filed: Jul. 10, 2015

(65) Prior Publication Data
US 2016/0012419 A1 Jan. 14, 2016

Related U.S. Application Data

(60) Provisional application No. 62/023,770, filed on Jul. 11, 2014.

(51) Int. Cl.
*G06Q 20/34* (2012.01)
*G06Q 20/38* (2012.01)

(52) U.S. Cl.
CPC ......... *G06Q 20/3572* (2013.01); *G06Q 20/34* (2013.01); *G06Q 20/354* (2013.01); *G06Q 20/383* (2013.01)

(58) Field of Classification Search
CPC .... G06Q 20/322; G06Q 20/36; G06Q 20/354; G06Q 20/34; G06Q 20/105; G06Q 20/342; G06Q 20/28; G06Q 20/40; G06Q 20/351

(Continued)

(56) References Cited

U.S. PATENT DOCUMENTS 4,701,601 A 10/1987 Francini et al.
5,918,909 A 7/1999 Fiala et al.
(Continued)

FOREIGN PATENT DOCUMENTS

AU 2011101134 10/2011
CA 2799237 6/2013
(Continued)

OTHER PUBLICATIONS

Wagner, "UK sees pre-paid payment card launch," Card Technology Today, v. 17, n. 9, Sep. 2005, pp. 3-4.
(Continued)

*Primary Examiner* — Hao Fu
(74) *Attorney, Agent, or Firm* — Duane Morris LLP

(57) ABSTRACT

The disclosed embodiments include methods and systems for validating, funding, activating, and reloading one or more configurable multicards. The disclosed embodiments may include a method that may include obtaining user authentication information relating to a first user associated with an inactivated multicard that is configurable for use for purchases and is configured with a zero multicard account balance amount. The method may include obtaining multicard configuration information including a unique multicard identification information that identifies the inactivated multicard and a first multicard account balance amount for the inactivated multicard. The method may also include validating the inactivated multicard using the unique multicard identification information and associating the inactivated multicard with a multicard account having the first multicard account balance that is funded from a financial account associated with the first user.

18 Claims, 5 Drawing Sheets

(58) Field of Classification Search
USPC .......................................................... 705/41
See application file for complete search history.

(56) References Cited

U.S. PATENT DOCUMENTS

| | | | |
|---|---|---|---|
| 6,298,336 B1* | 10/2001 | Davis | G06Q 20/105 705/41 |
| 6,422,459 B1 | 7/2002 | Kawan | |
| 6,837,426 B2 | 1/2005 | Tidball et al. | |
| 8,290,858 B1 | 10/2012 | Ankarath | |
| 8,688,548 B2 | 4/2014 | Vasten | |
| 8,756,150 B2 | 6/2014 | Flitcroft et al. | |
| 8,768,834 B2 | 7/2014 | Zacarias et al. | |
| 8,793,187 B2 | 7/2014 | Alvarez et al. | |
| 2003/0105672 A1 | 6/2003 | Epstein et al. | |
| 2007/0012759 A1 | 1/2007 | Allarea et al. | |
| 2008/0301041 A1 | 12/2008 | Bruk | |
| 2009/0283594 A1 | 11/2009 | Walton et al. | |
| 2010/0019028 A1 | 1/2010 | Books et al. | |
| 2010/0049653 A1* | 2/2010 | Grotto | G06Q 20/105 705/41 |
| 2010/0325006 A1* | 12/2010 | White | G06Q 20/105 705/26.1 |
| 2011/0246372 A1 | 10/2011 | Zloth et al. | |
| 2012/0234909 A1 | 9/2012 | Tang | |
| 2013/0013437 A1 | 1/2013 | Singh et al. | |
| 2013/0036048 A1* | 2/2013 | Campos | G06Q 20/36 705/41 |
| 2013/0054457 A1 | 2/2013 | Strickland | |
| 2013/0254086 A1 | 9/2013 | Joa et al. | |
| 2014/0046788 A1* | 2/2014 | Lee | G06Q 20/363 705/21 |
| 2014/0081769 A1 | 3/2014 | Wilen et al. | |
| 2014/0089114 A1 | 3/2014 | Dwyre et al. | |
| 2014/0089173 A1 | 3/2014 | Simonian | |
| 2014/0195425 A1 | 7/2014 | Campos et al. | |
| 2014/0214661 A1 | 7/2014 | Yankovich et al. | |
| 2014/0214667 A1 | 7/2014 | Wolfe | |
| 2014/0244496 A1* | 8/2014 | Langus | G06Q 20/3674 705/41 |
| 2014/0337233 A1 | 11/2014 | Phillips et al. | |
| 2015/0066757 A1* | 3/2015 | Shenoy | G06Q 20/28 705/41 |
| 2015/0186886 A1* | 7/2015 | Schwalb | G06Q 20/405 705/44 |

FOREIGN PATENT DOCUMENTS

| | | |
|---|---|---|
| CN | 2909409 | 6/2007 |
| KR | 20100057152 | 5/2010 |
| WO | WO 2009/074848 | 6/2009 |

OTHER PUBLICATIONS

Tunstall, "Electronic currency," Proceedings of the IFIP WG 11.6 International Conference, Jan. 2000 (2 pages).

Andel, "Packaging smarts," Paperboard Packaging, Mar. 2005 (3 pages).

Jankowski et al. "Investing in payment innovations: Risks and rewards," Chicago Fed Letter, No. 230b, Sep. 2006 (4 pages).

* cited by examiner

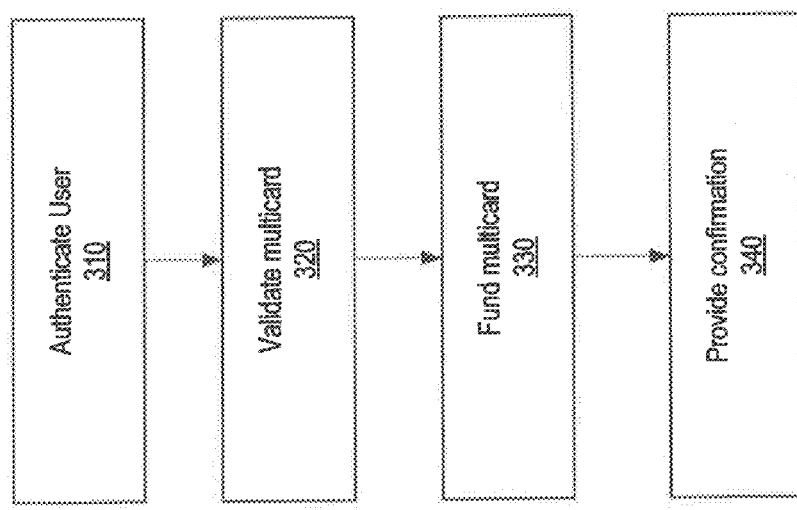

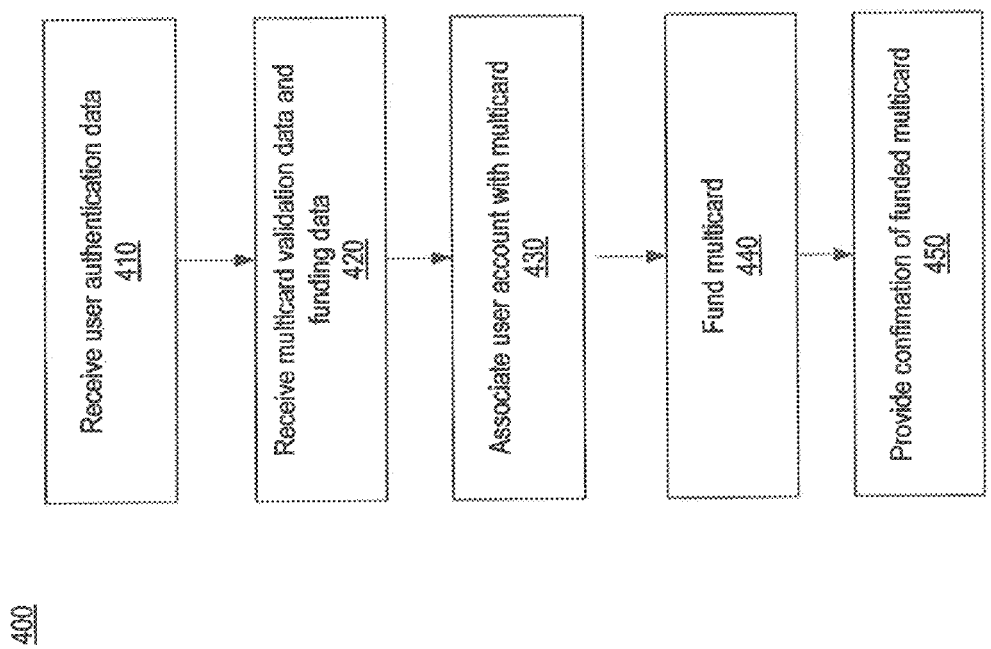

SYSTEMS AND METHODS FOR PROVIDING PRE-PAID MULTICARDS

CROSS-REFERENCE TO RELATED APPLICATION

This application claims the benefit of U.S. Provisional Patent Application No. 62/023,770, filed Jul. 11, 2014, which is expressly incorporated by reference to its entirety.

BACKGROUND

Technical Field

The present disclosure generally relates to systems and methods for providing account-based products, and more particularly to systems and methods for providing and configuring pre-paid multicards.

Background

Retailers and financial institutions currently offer pre-paid account cards of various denominations (e.g., $10, $20, $50, or $100) for sale in an inactive state. For example, a buyer may select a $50 gift card, and provide a corresponding retailer with funds equivalent to the $50 denomination of the gift card. The retailer may then "activate" the purchased gift card, which may be loaded with $50 in equivalent spendable funds. The buyer or any other individual may use the activated card to purchase goods and services from participating retailers. Further, after purchasing such goods and services, the buyer may provide additional funds to the retailer, who may "re-load" the card with the additional funds to facilitate future purchases.

By way of example, the buyer may purchase multiple prepaid account cards to reserve until needed as last-minute gifts, to give as incentives, or for other purposes. In these instances, an initial investment of capital may be required to load the prepaid account cards at the time of purchase. Thus, customary methods of purchasing and/or re-loading such prepaid account cards require an initial investment of capital by the buyer (e.g., to provide an initial balance on the prepaid account cards), and the buyer's initial capital investment may be "tied up" capital until the buyer uses the account cards or provides the account cards as gifts. In addition, between the time of purchase and the time of use or gift, the buyer may be subject to undue risk of financial loss due to theft, or damage, or loss of the activated and fully funded prepaid cards. Further, fees associated with such prepaid account cards may reduce a balance available to the buyer, or alternatively, to a recipient of gift cards. The disclosed embodiments provide methods and systems that address these and other concerns regarding conventional account instruments.

SUMMARY

The disclosed embodiments include methods and systems that validate, fund, activate, and reload configurable multicards. In one embodiment, a computer-implemented method obtains, by one or more processors, (i) user authentication information relating to a first user associated with a first inactivated multicard that is configurable for use for purchases and is configured with a zero multicard account balance amount, and (ii) first multicard configuration information including a unique multicard identifier that identifies the first inactivated multicard and a first multicard account balance amount for the first inactivated multicard. The method also validates, by the one or more processors, the first inactivated multicard using the unique multicard identifier, and associates, by the one or more processors, the first inactivated multicard with a first multicard account having the first multicard account balance amount. The method provides, by the one or more processors, first validation information including a first multicard funding confirmation to a device of the first user. In one aspects, the first multicard funding confirmation indicates that the first inactivated multicard is associated with the first multicard account balance amount such that the first inactivated multicard is usable, when activated, for purchases based on the first multicard account balance amount.

The disclosed embodiments also include a system having a storage device and at least one processor coupled to the storage device. The storage device may store software instructions for controlling the at least one processor when executed by the at least one processor. The at least one processor may be operative with the software instructions and being configured to obtain (I) user authentication information relating to a first user associated with a first inactivated multicard that is configurable for use for purchases and is configured with a zero multicard account balance amount, and (II) first multicard configuration information including a unique multicard identifier that identifies the first inactivated multicard and a first multicard account balance amount for the first inactivated multicard. The at least one processor may be further configured to validate the first inactivated multicard using the unique multicard identifier, and associate the first inactivated multicard with a first multicard account having the first multicard account balance amount. The at least one processor may be further configured to provide first validation information including a first multicard funding confirmation to a device of the first user. In one aspect, the first multicard funding confirmation indicates that the first inactivated multicard is associated with the first multicard account balance amount such that the first inactivated multicard is usable, when activated, for purchases based on the first multicard account balance amount.

The disclosed embodiments further include a tangible, non-transitory computer-readable medium storing instructions that, when executed by at least one processor, cause the at least one processor to perform a method. The method includes obtaining (i) user authentication information relating to a first user associated with a first inactivated multicard that is configurable for use for purchases and is configured with a zero multicard account balance amount, and (ii) first multicard configuration information including a unique multicard identifier that identifies the first inactivated multicard and a first multicard account balance amount for the first inactivated multicard. The method also includes validating the first inactivated multicard using the unique multicard identifier, and associating the first inactivated multicard with a first multicard account having the first multicard account balance amount. The method further includes providing first validation information including a first multicard funding confirmation to a device of the first user. In one aspect, the first multicard funding confirmation confirms that the first inactivated multicard is associated with the first multicard account balance amount such that the first inactivated multicard is usable, when activated, for purchases based on the first multicard account balance amount.

In certain example, exemplary objects and advantages of the disclosed embodiments may be set forth in part in the description that follows, and in part will be obvious from the description, or may be learned by practice of the disclosed embodiments. It is to be understood that both the foregoing general description and the following detailed description are exemplary and explanatory only and are not restrictive of the disclosed embodiments as claimed.

The accompanying drawings constitute a part of this specification. The drawings illustrate several embodiments of the present disclosure and, together with the description, serve to explain the principles of the disclosed embodiments as set forth in the accompanying claims.

BRIEF DESCRIPTION OF THE DRAWINGS

FIG. 3 depicts a flowchart of an exemplary process for providing a pre-paid multicard consistent with disclosed embodiments.

FIG. 4 depicts another exemplary process for providing a pre-paid multicard consistent with disclosed embodiments.

DESCRIPTION OF THE EMBODIMENTS

Reference will now be made in detail to embodiments of the present disclosure, examples of which are illustrated in the accompanying drawings. Wherever possible, the same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise.

Figure 1:
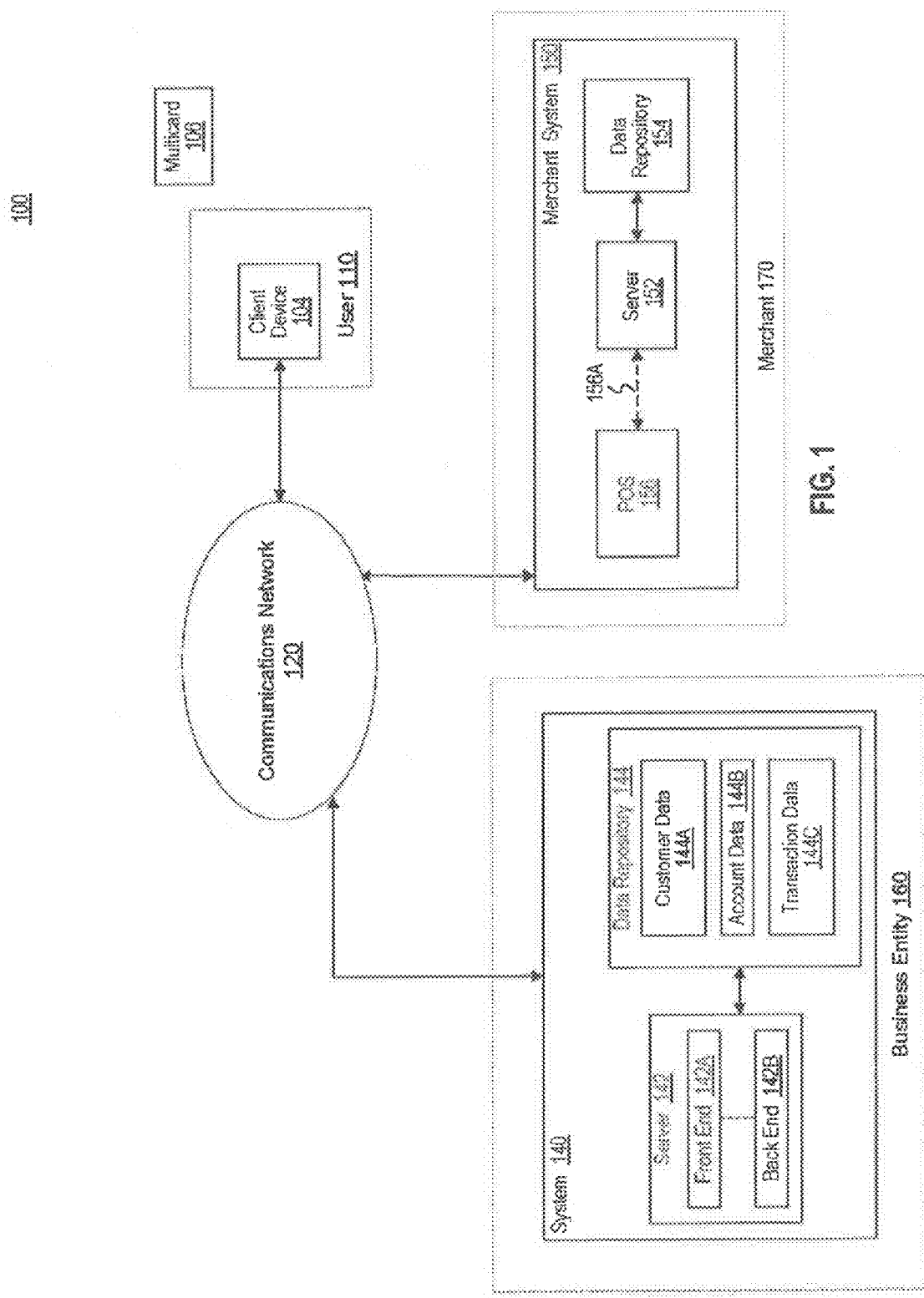
FIG. 1 depicts an exemplary computing environment consistent with disclosed embodiments.

FIG. 1 illustrates an exemplary computing environment 100 consistent with certain disclosed embodiments. In one aspect, computing environment 100 may include a client device 104, a system 140, a merchant system 150, and a communications network 120 connecting one or more of the components of environment 100. In disclosed embodiments, client device 104 may be configured to work in conjunction with system 140 and/or merchant system 150 to provide one or more configurable multicards 106.

In one embodiment, system 140 may be one or more computer systems configured to process and store information, and execute software instructions to perform one or more processes consistent with the disclosed embodiments. In certain exemplary embodiments, although not required, system 140 may be associated with a business entity 160. In certain embodiments, business entity 160 may be any type of business entity, such as a financial institution, a travel services business, a hotel or lodging business, or any other type of business entity. For example, system 140 may be a system associated with a commercial bank, an investment bank, a provider of a payment instrument or financial service accounts, etc. In some embodiments, a financial service account may be a check, savings, credit, debit, and/or a reward or loyalty account. In some aspects, a payment instrument may include, but is not limited to, a personal or corporate credit card, a debit card, a pre-paid credit or debit card, a pre-paid, general-purpose multicard, or check instruments. Business entity 160 may be an entity that provides accounts that may be used for purchasing goods and/or services, such as multicard accounts, which may, in certain embodiments, be used for purchases associated with one or more merchants (e.g., a merchant 170 associated with merchant system 150).

In certain embodiments, a multicard account may be an account that is associated with a multicard (e.g., a prepaid, general-purpose multicard). A multicard may be a general-purpose instrument that a user may carry and/or use to make purchases. For example, a multicard may be a plastic card (e.g., the form of a credit card instrument) that may include tangible computer-readable media (e.g., a magnetic strip configured to store information) consistent with known financial instruments (e.g., credit cards, debit cards, etc.) A multicard may also be a smart card that may include one or more memories and/or one or more processing devices (e.g., processor(s), electronic circuitry, logic, etc.). A multicard account may be configured as a financial account (e.g., a credit card account) that, for example, system 140 may be configured to create, store, and maintain, consistent with disclosed embodiments. While examples of a multicard are disclosed in connection with financial service accounts (e.g., accounts that may be used for purchases), the disclosed embodiments are not so limited. In certain aspects, a multicard may relate to other types of accounts, such as transportation credits (e.g., a subway fare card), service credit (e.g., landscaping services, personal grooming services, etc.), utility services credits (e.g., prepaid utility service amounts, hours of use, etc.), and other types of services. Thus, in certain aspects, a multicard (e.g., multicard 106) may be a credit-card sized plastic card, a paper card, an electronic multicard provided as part of an e-wallet system, an image of the electronic card printed by a purchaser of the electronic card, etc. It is contemplated that multicard 106 may take other physical or electronic forms, as understood by those skilled in the art.

In certain embodiments, system 140 may include one or more servers 142 and one or more data storages, such as data repository 144. Server 142 may be, for example, a computing system that processes, among other things, transactions, and thus for exemplary purposes only, may be configured to operate as a transaction server. A transaction may include financial transactions (e.g., purchase transactions, banking transactions, etc.), or other forms of transactions (e.g., access to a location, check out transactions of material, products, goods, etc., such as library transactions, etc.).

In one embodiment, server 142 may include a front end 142A, and a back end 142B in communication with front end 142A, although the configuration of server 142 is not limited to such configurations. In one example, front end 142A and back end 142B of server 142 may be incorporated into a single computer, a single server, or any additional or alternate computing device apparent to one or skill in the art. In other embodiments, front end 142A and backend 142B may be distributed computing devices. Further, in one embodiment, front end 142A may be one or more software programs, such as a software application (e.g., a web service) executed by one or more processors included in server 142. Similarly, backend 142B may be one or more software programs executed by one or more processors included in server 142. Server 142 is not limited to such configurations. In additional embodiments, front end 142A software can be executed by a server or computing system separate from a server or computing system that executes back end 142B.

Server 142 may be configured to execute software instructions to perform one or more processes consistent with the disclosed embodiments. In one embodiment, client device 104 may exchange information and parameters facilitating execution of one or more transactions associated with system 140. In one embodiment, where business entity 160 is a financial institution that provides financial service accounts and system 140 is configured to perform financial service account transaction processes, transactions may include, but are not limited to, a purchase or sale of goods or services, a transfer of funds between financial accounts (e.g., checking, savings, investment, etc.), a payment of a bill, a purchase or sale of a financial instrument or security, a deposit or withdrawal of funds, or an application for credit. In certain aspects, system 140 may provide one or more accounts associated with user 110 (or other user(s)) that may be used for purchases, or may have funds used to transfer to other accounts. In certain aspects, system 140 may provide one or more accounts that may fund a multicard account consistent with certain disclosed embodiments.

Figure 2:
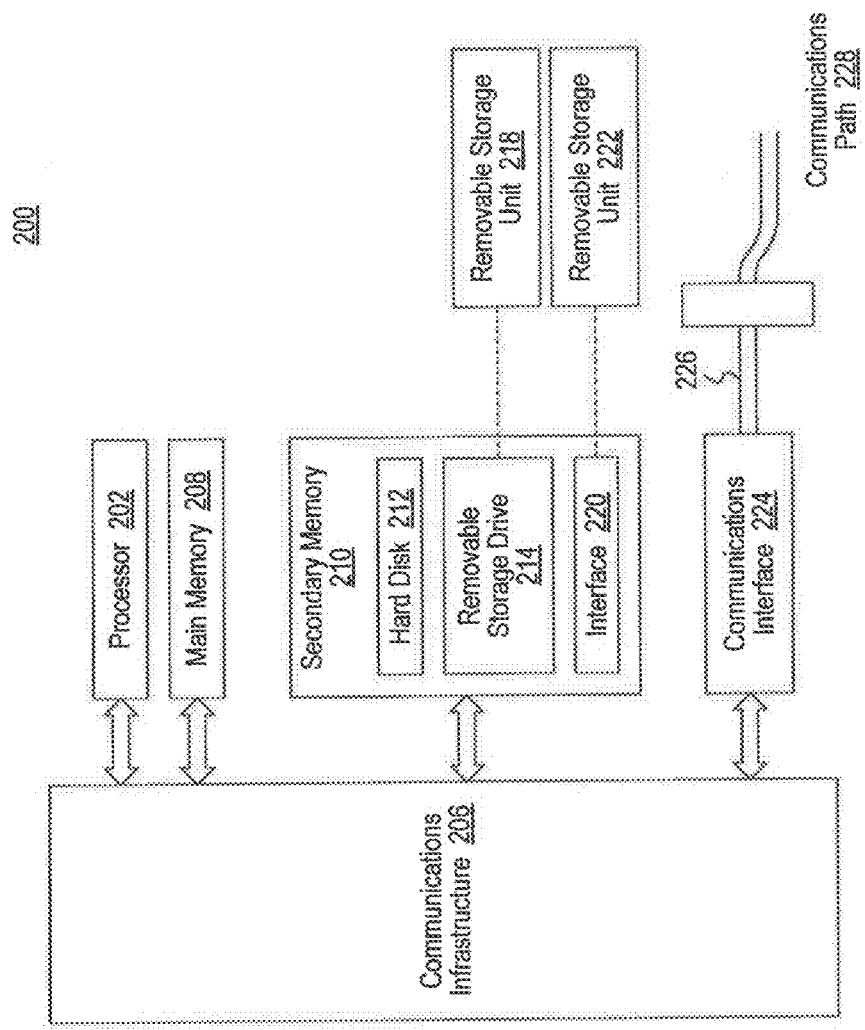
FIG. 2 depicts an exemplary computing system consistent with the disclosed embodiments.

Server 142 may be implemented with one or more processors or computer-based systems, such as for example, a computer system 200 of FIG. 2).

Data repository 144 may be one or more data storages configured to store information consistent with the disclosed embodiments. In one aspect, data repository 144 may include customer data 144A, account data 144B, and transaction data 144G. In one aspect, customer data 144A may include one or more data records uniquely identifying one or more users 110 of business entity 160 associated with system 140. By way of example, a customer of a financial institution (e.g., business entity 160) may access a web page associated with system 140 (e.g., through a web server executed by front end 142A), and subsequently register for online banking services and provide data. The data may be linked to the customer and stored within customer data 144A.

In certain aspects, customer data 144A may include personal information associated with a user 110 (e.g., a name, home address, or date of birth), demographic information (e.g., educational level, income level), government-issued identifiers (e.g., driver's license numbers or Social Security numbers), employment information (e.g., employer name or address), and/or contact information (e.g., e-mail addresses, home numbers, work numbers, or mobile numbers). Customer data 144A may also include one or more authentication credentials associated with registered customers of the issuing bank. For example, the authentication credentials may include, but are not limited to, a user name, a user-specified password, a system-generated password, or an alphanumeric identification number (e.g., a PIN number) specified by the user or assigned by system 140. Other types of customer information may be stored and used by the disclosed embodiments.

Additionally or alternatively, customer data 144A may include information facilitating enhanced authentication techniques. For example, customer data 144A may store information identifying a security question associated with a customer (e.g., "What is your mother's maiden name?") and the customer's registered answer to the security question. Customer data 144A may also include information identifying a particular security image or avatar selected by the user and displayed by the user during the authentication process.

Customer data 144A may include client device identification information identifying one or more client devices 104 registered to user 110. In one embodiment, the user may provide the client device identification information (e.g., a mobile telephone number provided by the user when registering for online banking services). Alternatively, server 142 may be configured to execute processes that automatically collect client device identification information (e.g., collecting an Internet Protocol (IP) address associated with the customer's smartphone).

In certain aspects, account data 144B may include account identification information identifying one or more accounts of customers of a financial institution (e.g., user 110 and business entity 160 associated with system 140). In one embodiment, account identification information may include financial service account information. For example, such service account information may include a checking account, a savings account, a revolving credit line, an account linked to a credit or debit card, a brokerage account, and any additional or alternate account provided or supported by the issuing bank. Information within account data 144B may also identify, for a single customer, one or more accounts associated with the customer and account data corresponding to the accounts (e.g., account, expiration date information, and/or card security codes, account balance information, and/or credit limit information).

Transaction data 144C may include information identifying one or more transactions involving one or more customers or accounts of business entity 160 associated with system 140. In one embodiment, such transactions may include, but are not limited to, purchase transactions (e.g., purchases of goods and/or services from electronic or physical retailers), financial service transactions (e.g., fund transfers), bill payment transactions (e.g., electronic bill payment transactions), financial instrument or security transactions (e.g., purchases of securities), deposits or withdrawals of funds, or applications for credit from the financial institution or other entity.

For example, system 140 may be configured to execute software instructions providing an online financial service portal enabling a user 110 (e.g., "customer") to perform financial service type transactions. In one embodiment, the service portal may enable the customer to transfer funds between a first customer account to a second account, to fund one or more general-purpose multicards, to schedule automatic bill payment services (e.g., select an amount and periodic payment date for making payments to an identified payee from the customer's selected financial account), to purchase goods or services, and other known types of online financial service processes. Server 142 may, by way of example, generate a data record within transaction data 144C corresponding to the particular service the customer initiates, such as an initiated transfer of funds, and may populate the data record with information associated with the initiated transaction. As an example, transaction information for a funds transfer to fund a general-purpose multicard may include, but is not limited to, a unique identifier associated with the fund transfer transaction, a timestamp of the transaction, and transaction parameter information (e.g., a source account, a target account, a currency type, a transaction date, and an amount of transfer).

In certain embodiments, system 140 (or another system in communication with system 140) may provide an online portal to allow user 110 to configure one or more general-purpose multicards and associated multicard accounts in accordance with certain disclosed embodiments. For example, system 140 may provide a web site that user 110 may access via communication network 120 to configure and customize a general-purpose multicard for use by user 110 or another user, consistent with disclosed embodiments. In this regard, system 140 may include known computing components and infrastructures used to provide the web site and underlying web pages, interfaces, and communication technologies to allow user 110 to provide information via client device 104 (e.g., through a web browser, smart phone interfaces, etc.).

Merchant system 150 may be one or more computer systems associated with a business entity, e.g., a merchant 170, that provides products and/or services. In one example, merchant 170 may represent a retailer having one or more physical retail locations disposed within a geographic area (e.g., a "physical retailer"). Merchant 170 may also represent a retailer that provides electronic or e-commerce type retail services. In one example, merchant system 150 may be associated with an electronic or an e-commerce retailer 170 that interacts with consumers through corresponding web interfaces, digital wallets, or retailer-specific application programs (e.g., mobile "apps"). In one embodiment, one or more client devices 104 can exchange information with merchant system 150 to purchase one or more goods and/or services using various payment instruments, such as funded and activated multicards. Merchant system 150 may exchange information with payment network 130 and system 140 over communications network 120 to obtain authorization for such purchase instruments. For example, user 110 may perform a mobile payment using client device 104 and point-of-sale (POS) device using known mobile payment processes and components.

In other embodiments, merchant 170 may represent any additional or alternate type of business entity that may receive and use transaction accounts to perform some service or provide some product. For example, merchant 170 may represent a business, a place of work, a government agency, an academic institution, a library, a travel services business (e.g., passport or airport security identification services business), car rental agency, etc. In such embodiments, depending on the nature of the business provided, system 150 may use different devices, and/or require different authorization levels, to receive the transaction account from client device 104 (e.g., a reader device in place of POS 156).

In one embodiment, merchant system 150 may include a merchant server 152, a data repository 154, and point-of-sale (POS) module 156. Although not depicted in FIG. 1, merchant server 152 may include a front end and a back end disposed in communication with the front end as previously discussed. In certain aspects, the front and back ends may be incorporated into a hardware unit (e.g., a single computer, a single server, or any additional or alternate computing device apparent to one skilled in the art). In other embodiments, the front end may be a software application, such as a web service, executing on merchant server 152. Merchant server 152 is not limited to such configurations, however, and the front end may be executed on any computer or server separate from the back end.

In one embodiment, POS 156 may be one or more point-of-sale devices configured to perform known point-of-sale processes. POS module 156 may be disposed at a physical location in a merchant location associated with merchant system 150, such as a location where user 110 may provide payment for goods and/or services (e.g., at a cash register at the merchant) using, for example, client device 104. The disclosed embodiments are not limited to such physical POS modules, and in additional embodiments, POS module 156 may be a software module executed by merchant server 152, servers 142 or 160, or one or more of client devices 104. Further, POS 156 may represent a device communicatively coupled to one or more of client device 104 (e.g., a Square) to provide mobile point-of-sale and payment services. POS 156 may also facilitate mobile payment systems through a mobile wallet technology such as, for example, Google Wallet™ or other known electronic or digital wallet technologies.

In some embodiments, one or more communications links may facilitate communications between POS 156, client device 104, system 140, and/or merchant server 152 or some other system that may be included in system environment 100. The communications link may include a separate communication link, such as, a wired cable connection, a wireless connection, a Bluetooth connection, and/or a near field communication (NFC) connection. Additionally or alternatively, POS 156 may communicate with client device 104, merchant server 152, and/or system 140 across communications network 120 using any of a number of communications protocols, such as hypertext transfer protocol (HTTP) and transmission control protocol/internet protocol (TCP/IP).

In one embodiment, merchant 170 may be associated with one or more point-of-sale devices configured to provide payment services and to perform known point of sale processes. Server 152 and/or POS 156 may be implemented with a processor or computer-based system (e.g., computer-system 200 of FIG. 2), may be configured to execute software instructions to transmit and receive data across network 120, or another communication link, using any of the communications protocols outlined herein. For example, POS 156 may directly communicate with network 120 through a corresponding interface, and additionally or alternatively, may access communication network 120 via a server associated with the merchant (e.g., via communications link to merchant server 152 of FIG. 1).

Client device 104 may be one or more client devices. In certain embodiments, client device 104 may be associated with one or more users 110. In one example, user 110 may use client device 104 to provide input that may be used to perform one or more processes consistent with the disclosed embodiments. For example, user 110 may use client device 104 to perform a transaction involving an account associated with the user and provided, maintained, managed, and/or processed by system 140. In certain aspects, client device 104 can include, but is not limited to, a personal computer, a laptop computer, a tablet computer, a notebook computer, a hand-held computer, a personal digital assistant, a portable navigation device, a mobile phone, a wearable device, an embedded device, a smart phone, a set top box, third party portals, an optical disk player (e.g., a DVD player), a digital video recorder (DVR), and any additional or alternate computing device, and may be operable to transmit and receive data across network 120. Client device 104 may be implemented with one or more processors or computer-based systems, such as for example, computer-system 200 of FIG. 2. System 100 may include multiple client devices 104 that may be each associated with one or more users. For example, in addition to user 110 and client device 104, the disclosed embodiments may operate in connection with a second user that may operate a second client device that may communicate with one or more components of system 100.

Further, although computing environment 100 is illustrated in FIG. 1 with one client device 104, that the disclosed embodiments may include a plurality of client devices 104. Similarly, although computing environment 100 is illustrated in FIG. 1 with a single merchant system 150, system 140, and client device 104, the disclosed embodiments may include any number of additional components of system 100.

Communications network 120 may include one or more communication networks or medium of digital data communication. Examples of communication network 120 include a local area network ("LAN"), a wireless LAN, a RF network, a Near Field Communication (NFC) network, (e.g., a "WIFi" network), a wireless Metropolitan Area Network (MAN) connecting multiple wireless LANs, NFC communication link(s), and a wide area network ("WAN"), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, communications network 120 may also include one or more mobile device networks, such as a GSM network or a PCS network, allowing client device 104 to send and receive data via applicable communications protocols, including those described herein.

In certain embodiments, one or more of server 142 and merchant server 152 may include a computer system (e.g., a personal computer, network computer, server, or mainframe computer) having one or more processors selectively activated or reconfigured by a computer program. In additional embodiments, one or more of server 142 and merchant server 152 may be incorporated as corresponding nodes in a distributed network, and additionally or alternatively, as corresponding networked servers in a cloud-computing environment. Furthermore, server 142 and/or merchant server 152 may communicate via network 120 with one or more additional servers (not shown), which facilitate the distribution of processes for parallel execution by the additional servers.

FIG. 2 illustrates an exemplary computer system 200 with which certain embodiments may be implemented. In certain embodiments, computer system 200 may reflect computer systems associated with system 140, server 142, system 150, server 152, and/or client device 104. In certain embodiments, computer system 200 may include one or more processors 202. Processor 202 may be connected to a communication infrastructure 206, such as a bus or communications network, e.g., a communications network 120 depicted in FIG. 1.

Computer system 200 may also include a main memory 208, for example, random access memory (RAM), and may include a secondary memory 210. Memory 208 may represent a tangible and non-transitory computer-readable medium having stored therein computer programs, sets of instructions, code, or data to be executed by processor 202. Secondary memory 210 may include, for example, a hard disk drive 212, and/or a removable storage drive 214, representing a magnetic tape drive, flash memory, an optical disk drive, CD/DVD drive, etc. The removable storage drive 214 may read from and/or write to a removable storage unit 218 in a well-known manner. Removable storage unit 218 may represent a magnetic tape, optical disk, or other storage medium that is read by and written to by removable storage drive 214. Removable storage unit 218 may represent a tangible and non-transitory computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, etc. Communications interface 224 may transfer software and data in the form of signals 226, which may be electronic, electromagnetic, optical or other signals capable of being received by communications interface 224. These signals 226 may be provided to communications interface 224 via a communications path (i.e., channel 228). Channel 228 carries signals 226 and may be implemented using wire, cable, fiber optics, RF link, and/or other communications channels. In a disclosed embodiment, signals 226 comprise data packets sent to processor 202. Information representing processed packets can also be sent in the form of signals 226 from processor 202 through communications path 228.

In certain embodiments in connection with FIG. 2, the terms "storage device" and "storage medium" may refer to particular tangible storage devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which may respectively provide computer programs and/or sets of instructions to processor 202 of computer system 200. Such computer programs and sets of instructions can be stored within one or more computer-readable media. Additionally or alternatively, computer programs and sets of instructions may also be received via communications interface 224 and stored on the one or more computer-readable media.

Such computer programs and instructions, when executed by processor 202, enable processor 202 to perform one or more processes consistent with the disclosed embodiments. Examples of program instructions include, for example, machine code, such as code produced by a compiler, and files containing a high-level code that can be executed by processor 202 using an interpreter.

Furthermore, the computer-implemented methods described herein can be implemented on a single processor of a computer system, such as processor 202 of system 200. In additional embodiments, however, these computer-implemented methods may be implemented using one or more processors within a single computer system, and additionally or alternatively, these computer-implemented methods may be implemented on one or more processors within separate computer systems linked via a network.

The disclosed embodiments include computer-implemented systems and methods for validating, funding, activating, and/or reloading one or ore general-purpose multicards. As described herein, a multicard may represent a general-purpose physical or electronic payment instrument that an individual (e.g., user 110) may present to participating retailers (e.g., merchant 170) to purchase goods or services. Additionally or alternatively, user 110 may also present a multicard to a financial institution (e.g., business entity 140 of FIG. 1) to transfer funds from the multicard to an account held by user 110 at the financial institution. Further, in additional embodiments, user 110 may use a multicard to obtain cash from an automated teller machine (ATM) or a point-of-sale (POS) system associated with merchant 170 (e.g., POS 156). The disclosed embodiments are not limited to such exemplary applications, and in further embodiments, user 110 may use an activated and funded general purpose multicard as a cash substitute in any additional or alternate manner appropriate to conventional cash substitutes, such as credit cards, bank, cards, and debit cards.

In certain aspects, user 110 may purchase one or more multicards (e.g., general-purpose multicards) from a retailer in an unfunded, inactive state. For example, user 110 may purchase a single unfunded, inactive multicard from merchant 170 or from a financial institution (e.g., business entity 160 associated with system 140). Further, in some embodiments, user 110 may purchase a package of unfunded, inactive multicards (e.g., a package of ten multicards) from merchant 170 and/or business entity 160. In some aspects, user 110 may retain the purchased multicards for subsequent distribution as gifts, incentives, rewards, and/or reimbursements.

In an embodiment, an unfunded and inactive multicard may be associated with a multicard account having a zero account balance. Additionally or alternatively, a multicard may not be associated with or linked to a multicard account when in the unfunded, inactive state. By way of example, the unfunded and inactive multicard may not be usable for purchases of goods and services from retailers, merchants, and businesses (e.g., merchant 170 and/or business entity 160), and a "value" associated with the unfunded and inactive multicard may be limited to a manufacturing and packaging cost of the multicard. Merchant 170 and/or business entity 160 may thus offer the unfunded and inactive multicards for sale at relatively low prices (e.g., $1.00 per multicard card or $10.00 for a pack of three cards). Further, in certain aspects, should user 110 lose or have one or more of the purchased multicards stolen prior to activation and funding, the value lost by user 110 may be limited to the sale price of the lost or stolen multicards. User 110 may, for example, retain or store the multicards for significant time periods after purchase without concern for loss of funds.

In certain aspects, system 140, client device 104, and/or merchant system 150 may configured to validate, fund, and/or activate one or more of the purchased multicards. For example, as described above, user 110 may purchase a package of ten unfunded and inactive multicards for merchant 170, and may subsequently validate, fund, and activate the purchased multicards prior to distributing the multicards as gifts, incentives, rewards, and/or reimbursements. A particular type of unfunded and inactive multicard (e.g., credit, debit, etc.) may be determined upon purchase of the multicard from merchant 170. In certain aspects, the computer-implemented systems and methods described herein may enable user 110 to associate and fund the purchased multicards with corresponding multicard accounts and multicard account balance amounts (e.g., $100), and further, to specify currencies that denominate the multicard account balance amounts.

The funded multicards may, in some aspects, remain configured in an inactive state after initial funding. In such an inactive state, user 110 and/or any other user (e.g., a recipient of one of the funded multicards) may be unable to use the funded multicards for purchases of goods and services. In certain aspects, the inactive state of the funded multicards protects user 110's investment in the funded multicards against theft or loss.

In certain embodiments, the computer-implemented systems and methods described herein may enable user 110 and/or another user to request an activation of a previously funded multicard. For example, user 110 may purchase a package of inactive, unfunded multicards, may fund one or more of the multicards with a specified multicard account balance, and may activate the funded multicards prior to distribution to other users as gifts, rewards, incentives, and/or reimbursements. Alternatively, user 110 may fund one or more of the purchased multicards with a specified balance, and then distribute the funded multicards to the additional user in an inactive state. The additional user may, for example, leverage the computer-implemented systems and method described herein to activate the previously funded multicard or multicards received from user 110.

In some aspects, system 140 and/or client device 104 may be configured to perform one or more processes that enable the configuration, funding, and activation of multicard(s). For example, a user, regardless of whether they are a merchant by profession, may request to activate one or more multicards on their home personal computer, tablet, laptop, mobile phone, etc.

In certain embodiments, an activated and funded multicard may be used for purchases or services in a manner similar to a bankcard, check card, credit card, and/or debit card. By way of example, a user (e.g., user 110 or any additional user) may substitute the activated and funded multicard for cash payment when making a purchase of goods or services from a participating merchant (e.g., a merchant that accepts the activated multicard). In some aspects, the activated multicard may correspond to a payment instrument associated with a particular business entity that provides payment network services (e.g., Visa™, MasterCard™, etc.), and may include information identifying the payment network entity (e.g., a Visa™ symbol) on one or more faces of the multicard (e.g., multicard 106).

In other aspects, an activated and funded multicard may be associated with a particular merchant, and additionally or alternatively, a group of merchants disposed within a particular geographic region (e.g., a shopping mall) or associated with a particular retail industry (e.g., restaurants). For example, the activated and funded multicard may be used to purchase goods and services from the particular merchant and/or group of merchants. Further, in some embodiments, the particular merchant or groups of merchants may generate, store, and maintain multicard account information for activated and funded multicard. In other embodiments, system 140 may generate, store, and maintain such multicard account information.

FIG. 3 is a flowchart of an exemplary multicard configuration process 300, consistent with disclosed embodiments. In certain embodiments, client device 104 may perform one or more operations of exemplary process 300. In one example, client device 104 may be configured to authenticate a user, e.g., user 110, who may have obtained an inactivated multicard (e.g., in step 310). In some aspects, client device 104 may provide an interface that prompts the user to input authentication data (e.g., user identification data, passwords or other credentials). For example, the interface may be generated by an application program executed by client device 104 (e.g., a mobile application provided by system 140), or alternatively, the interface may be provided by a web page rendered for display by client device 104. Client device 104 may use the authentication data to authenticate user 110 with credential information such as account data 144B, customer data 144A, and/or other information that may be obtained from system 140 and stored in a local memory. In one aspect, client device 104 may have credential information stored locally, which may be updated periodically by one or more remote servers (e.g., server 142 or data repository 144). In some embodiments, authentication credentials are stored and maintained on one or more remote servers, for example, system 140. Accordingly, authenticating the user 110 may include executing software instructions that perform processes that transmit the authentication data to a receiving system (e.g., system 140), and receive an authentication response from the receiving system. For example, client device 104 may provide the user authentication data to system 140, which may be configured to perform authentication operations based on, for example, account data 144B, customer data 144A, and/or other information.

In certain embodiments, depending on the computing environment, the processor executing program instructions described herein may be located at client device 104, or on one or more processors remotely located in computing environment 100 (e.g., via system 140). Accordingly, it is understood that certain program instructions executed by any device in computing environment 100 (e.g., client device 104) may alternatively be executed via one or more processors located remotely in a distributed computing environment, and operating across communications network 120. For example, some or all aspects of process 300 may execute via one or more programs containing software instructions executed via one or more client device 104 processors. Client device 104 may be configured to execute software instructions stored locally in a computer memory, or may execute software instructions stored remotely, for example, at system 140 or data repository 144, yet execute the remotely stored instructions on a local processor.

In certain aspects, the disclosed embodiments may validate a previously purchased, received, and/or obtained multicard (e.g., in step 320). For example, client device 104 may be configured to execute software instructions that request information from user 110 that may be used to validate inactivated multicard 106. In one aspect, client device 104 may obtain multicard configuration information from user 110 that may be used to validate the multicard. In one aspect, client device 104 may perform processes to validate the multicard, or in other aspects, client device 104 may provide the obtained configuration information to system 140 (or another system) to perform the validation processes.

In one aspect, client device 104 may obtain unique multicard identification information associated with the multicard 106 (e.g., in step 320). The multicard identification information may be included on the multicard (e.g., printed on a surface of the multicard), may be provided with a receipt after purchase of the multicard, or provided electronically by the merchant, vendor, or financial institution who sold the card to user 112, system 140, or another system. In one embodiment, the validating system (e.g., system 140, client device 104, and/or another system) may perform a multicard validation process, which may include comparing the unique identification information obtained from user 110 to stored multicard data reflecting one or more validated multicards (e.g., multicards that were flagged as purchased, were distributed by the multicard provider, etc.). The validation process may generate a validation result, which may indicate that the multicard is valid for configuration and activation, or that the multicard is fraudulent or already activated/in use.

In certain embodiments, client device 104 may obtain the multicard identification information by user entry into an interface displayed by client device 104, by a card reader module operating in client device 104, or other input mechanisms. For example, client device 104 may be configured to prompt user 110 for multicard identification information, receive the input, and transmit the multicard information to one or more remote systems (e.g., system 140).

In some aspects, the unique multicard identification information may be displayed on a surface of multicard 106 in a human-readable form, such as a printed string of numbers, letters, symbols, etc. In some aspects, the unique identification information may be presented on a surface of multicard 106 in a machine-readable form, for example, as identification indicia printed on the multicard. Client device 104 may be configured to capture, via a digital image capturing device operatively connected to client device 104, an image of unique identification indicia printed on the inactivated multicard. The indicia may contain the unique identification information of the inactivated multicard in the form of machine-readable data, such as, for example, one-dimensional barcode data, or two-dimensional barcode data such as a micro PDF, PDF-417, data matrix, OR code, Aztec or Maxicode. The unique identification information may also be stored on the multicard via a magnetic strip storing numeric data. In other embodiments, for example, multicard 106 may be a smartcard containing an imbedded microprocessor, data storage, radio frequency identification (RFID) device and/or other data storage and processing components known in the art, and configured to display, send, or otherwise provide unique multicard identification information.

In certain embodiments, client device 104 may provide both unique identification information and user identification information as multicard configuration information to system 140. In other aspects, the user authentication information may also include unique identification information that uniquely identifies multicard 106. In still other aspects, user authentication information may be separate and distinct from unique multicard information, where one or more processors transmits unique multicard information to merchant system 150, for multicard validation, and one or more processors transmits user authentication information to system 140 for user account authentication. According to other embodiments, both the user authentication information and unique multicard information may be transmitted to the same receiving entity or system (e.g., client device 104 transmits both sets of data as configuration information to system 140, merchant system 150, or another system).

The disclosed embodiments may execute software that performs funding operations to fund multicard 106 (e.g., in step 330) In one embodiment, a multicard may be funded with a specified multicard account balance transferred or obtained from one or more financial services accounts associated with user 110. For example, client device 104 may perform processes that generate and provide an interface that requests input from user 110 to identify an amount of funds for the multicard account balance, the source account to draw the funds from, a currency denominating the multicard account balance (e.g., U.S. dollars, Euros, and/or Chinese yuan) and any other information that may be needed to perform electronic transfer operations. Client device 104 may receive the user input and provide the obtained fund information to system 140 (or another system) for funding the multicard in accordance with the configuration selections by user 110. For example, client device 104 may obtain input from user 110 that reflects the desire of user 110 to fund the multicard from a specified financial services account.

Client device 104 may receive a confirmation from system 140 (or other system) that the multicard 106 has been funded with the specified multicard account balance selected by user 110. In response, client device 104 may generate and provide a confirmation message that may be displayed in an interface provided by client device 104 (e.g., in step 340). In certain embodiments, client device 104 may provide the confirmation message to user 110 in other ways, such as email, or SMS text message, etc.

FIG. 4 is a flowchart of an exemplary multicard configuration process 400, consistent with disclosed embodiments. In one embodiment, one or more operations of process 400 may be performed by system 140. In one aspect, in response to a multicard validation and funding request initiated by user 110, a receiving system (e.g., system 140) may receive multicard configuration information, user authentication information, and/or validation data from client device 104, determine a validity and/or authenticity of user 110 and identified multicard, fund the multicard based on multicard configuration information, and generate and provide a confirmation back to the requesting device (e.g., client device 104 operated by user 110).

As an example, system 140 may receive, from client device 104, the user authentication information (e.g., in step 410). In other embodiments, system 140 may receive, from client device 104, the unique multicard information (e.g., in step 420), or both (e.g., in steps 410 and 420 combined). As described herein, and in certain embodiments, system 140 may be associated with business entity 160, and may control and maintain one or more financial services accounts associated with user 110 and multicard accounts associated with multicards. In other embodiments, system 140 may receive user authentication from client device 104 via communications network 120, validate a financial services account associated with user 110 for funding multicard 106, and transmit the funding information to another system (e.g., merchant system 150) for creating, funding, activating, etc. multicard(s) for user 110 or other users. In one embodiment, merchant system 150 may include one or more databases including a set of valid multicard identifications that may be used to validate a multicard, and including multicard account information of validated multicards. In other aspects, system 140 may maintain one or more databases including valid multicard identifications.

In additional embodiments, system 140 may receive funding data from client device 104 reflecting a multicard account balance amount specified by user 110 (e.g., in step 420). Further, in certain aspects, the funding data may specify a currency that denominates the multicard account balance amount. For example, the funding data may specify a currency of a nation in which user 110 purchased multicard 106, and additionally or alternatively, may indicate any of a number of currencies specified by user 110. For example, user 110 may purchase the multicard 106 in the United States, but may specify a multicard account balance amount denominated in Chinese yuan to facilitate planned travel to China. In some embodiments, the funding data may be provided as multicard configuration information from client device 104.

Based on the user authentication data and/or multicard configuration information (e.g., multicard validation information, funding data, etc.), system 140 may associate user 110 with the multicard 106 (e.g., in step 430). In general, associating user 110 with multicard 106 may include associating one or more financial services accounts held by user 110, with which the receiving entity may fund multicard 106.

In one aspect, system 140 may also generate and store a multicard account for multicard 106. In one embodiment, system 140 may generate the multicard account after validating multicard 106. In other aspects, the receiving system may generate the multicard account after receiving multicard configuration information, such as a multicard account balance. In other embodiments, the receiving system may generate and store the multicard account after determining a valid financial service account that is to be used to fund the multicard. In another aspect, the receiving system may generate a multicard account at another time, or in response to other conditions or information.

In another embodiment, system 140 may fund multicard 106 (e.g., in step 440). In one aspect, system 140 may fund multicard 106 by transferring funds from one or more determined financial service accounts to the generated multicard account. The funds may be an amount based on that identified in the multicard account balance specified by user 110 with the multicard configuration information provided by client device 104. In certain embodiments, system 140 may withdraw funds from one or more specified financial services accounts associated with user 110 and deposit the funds to a multicard account associated with multicard 106. In another embodiment, system 140 may fund multicard 106 by associating a financial services account held by user 110 with the generated multicard account, without transferring funds to the multicard account. For example, instead of maintaining an account balance for the multicard account, system 140 may be configured to perform processes that link the a financial service account of user 110 to the multicard 106 such that purchases used by the multicard 106, once activated, are funded from the financial service account up to a determined amount (e.g., the amount identified by user 110 when configuring the multicard). Further, in some aspects, the funds transferred to multicard 106 may be denominated in a currency of a nation in which user 110 purchased multicard 106, and additionally or alternatively, in a currency specified by user 110. Accordingly, a recipient of multicard 106 may use activated multicard 106 for purchases, where each purchase debits or withdraws the corresponding purchase amount from the associated financial service account until a predetermined limit has been reached.

In certain embodiments, system 140 may provide confirmation of the funded multicard 106 (e.g., in step 450). For example, system 140 may generate and provide information to client device 104 that confirms the establishment of an account associated with multicard 106 and having a balance as requested by user 110. The confirmation may include validation information, which includes, but is not limited to, information identifying user 110, information identifying an actual or intended recipient of multicard 106, financial services account information associated with the accounts used to fund the multicard account, a funding amount, a currency type, a type of multicard, date and time information, information identifying a valid multicard user, and any additional or alternate information appropriate to multicard 106, system 140, and client device 104.

The disclosed embodiments may also facilitate an activation of funded multicard 106 (e.g., as validated and funded using the exemplary processes described above). In one example, user 110, and additionally or alternatively, a different user (e.g., a recipient of the funded multicard from user 110), may request the activation of funded multicard 106. In one aspect, user 110 may request activation through a client device (e.g., client device 104). A client device 104 may generate an interface (e.g., a telephone call to an activation agent, a smart phone application, browser accessing a web page, etc.) that enables the user to request activation. The client device may provide the request to a receiving system (e.g., system 140, system 150, etc.) that maintains and manages the validation, funding, and/or activation of multicard 106. As described herein, the receiving system may, based on the request, perform processes that activate multicard 106 for use in purchases in accordance with one or more multicard parameters (e.g., multicard parameters established by user 110 or another activating user).

In the embodiments described above, system 140 may be configured to execute software instructions that perform the validation, funding, and activation steps of exemplary process 400. In additional embodiments, as described above, system 140 may receive user authentication from client device 104, may validate a financial services account associated with user 110 for funding multicard 106, and transmit the funding information to another system (e.g., merchant system 150) for fund and/or activate multicard 106. In other aspects, client device 104 may perform one or more of the steps of exemplary process 400, either alone or in conjunction with one or more of systems 140 and 150.

Further, in certain aspects, system 140 (or another system configured to validate and fund multicards) may receive information indicating a depletion of funds associated with activated multicard 106, and may subsequently execute software instructions to render multicard 106 inactive. For example, system 140 may configure multicard 106 in an inactive state when a multicard account balance of multicard 106 reaches zero, or alternatively, falls below a pre-determined threshold value (e.g., a value required to establish a "hold" on multicard 106 for a purchase, or a value specified by user 110 within the configuration information). System 140 may provide client device 104 a confirmation of the deactivation of multicard 106, and further, may provide client device 104 with various alerts of an impending deactivation, which client device 104 may render and present to user 110. Upon deactivation of multicard 106, user 110 will be unable to use multicard 106 for future purchases of goods and services until additional funds are added to inactivated multicard 106 through a "re-loading" process, as described below.

In certain aspects, user 110 may deplete a portion of the funds allocated to multicard 106 through purchases of goods and services at various physical and online retailers. For example, user 110, or alternatively, an individual acting on behalf of user 110 (e.g., a parent or an individual that purchased multicard 106) may access a corresponding graphical user interface (GUI) on client device 104 and request that multicard 106 be "re-loaded" with a specified amount of funds. For example, as described above, the GUI may be provided by a native application executed by client device 104 (e.g., a mobile application associated with and provided by system 140), and additionally or alternatively, through a web page provided by system 140 and rendered for display by client device 104. Alternatively, user 100 may leverage client device 104 to access a telephonic menu provided by system 140 (e.g., through a corresponding toll-free number displayed on a surface of multicard 106) and submit the request to reload multicard 106 with additional funds. Further, in other embodiments, user 110 may return multicard 100 to a financial institution or merchant from whom user 110 purchased multicard 106, and request that the financial institution or merchant re-load multicard 106 with the desired funds.

Upon receipt of a request to reload multicard 106 from client device 104, system 140 (and additionally or alternatively, client device 104 and system 150) may execute software instructions that implement the exemplary processes described above to authenticate user 110, re-validate multicard 106, reload multicard 106 with the provided funds, and re-activate multicard 106. By way of example, user 110 may reload multicard 106 for additional purchases at physical retailers and online retailers, and further, for deposit of funds into one or more accounts of user 110 (e.g., through a corresponding ATM).

As described above, computer-implemented systems and methods consistent with the disclosed embodiments may be configured to validate, fund, activate, and/or reload one or ore general-purpose multicards previously purchased, obtained, and/or received by user 110. In some aspects, user 110 may purchase the general-purpose multicards in an unfunded state, and as such, user 110 need not make an initial capital investment to load the general-purpose multicards (and tie-up the initial capital investment) prior to use or distribution. Further, user 110's initial investment of capital may be limited to a nominal purchase price representative of manufacturing and packaging costs of the multicards. Thus, should user 110 lose or have one or more of the purchased multicards stolen prior to activation and funding, the value lost by user 110 may be limited to the sale price of the lost or stolen multicards, and a potential fraudulent use of the lost or stolen multicards may be reduced. Furthermore, and as outlined below, multicards consistent with the disclosed embodiments may include electronic multicards that user 110 may print "on-demand" for anticipated use or distribution, and additionally or alternatively, present to a merchant in electronic form via client device 104.

In some aspects, user 110 may purchase inactive multicards with an intention to validate, fund, activate, and subsequently present the multicards to as a gift or incentive to a recipient days, weeks, or months after purchase. For example, user 110 may purchase inactive multicards (e.g., a pack of three, five, or ten multicards) having a zero account balance from a merchant or a financial institution. By way of example, user 110 may access a corresponding graphical user interface (GUI) on client device 104, and may request that system 140 validate and fund the purchased multicards using one or more of the techniques described above in references to FIGS. 3 and 4 before providing the multicards to a recipient. Further, and as described herein, the recipient may, through a corresponding client device, request that system 140 activate the purchased multicards.

The recipient may use the activated and funded multicards to purchase goods and services from one or more physical retailers and online retailers, to deposit corresponding funds into an account held by the recipient, or to convert the loaded funds into cash at an ATM machine. Further, the recipient, and additionally or alternatively, user 110, may request, through a corresponding GUI on a client device (e.g., client device 104), that system 140 reload one or more of the multicards with additional funds using the processes described above. In some aspects, the disclosed embodiments may be configured to enable user 110 to purchase and hold multiple inactive multicards for future presentation without a substantial investment of capital at the time of purchase.

Further, in certain aspects, user 110 may be a parent, and user 110 may purchase inactive and unfunded multicards (e.g., a pack of ten multicards) from a retailer or a financial institution provide discrete allotments of funds to their children immediately or days, weeks or months later. For example, the parent may wish to provide funds to their children to purchase books and school supplies prior to the start of a current school term, and additionally or alternatively, funds to purchase lunches and snacks during the school day. In other aspects, the parent may provide a regular allowance to the children using funds loaded and subsequently reloaded to corresponding multicards.

For example, user 110 may, through client device 104, request that system 140 validate, load, and activate the purchased multicards using one or more of the techniques described above before providing the multicards to the children. The children may use the activated multicards to purchase goods and services, to deposit corresponding funds into one of their accounts, or to convert the loaded funds into cash at an ATM machine. Furthermore, the children and/or the parent may, through client device 104 (or other client device), request that system 140 reload one or more of the multicards with additional funds using the processes described above. The disclosed embodiments may, for example, be configured to enable the parent to provide funds to their children without obtaining and holding large amounts of cash, and further, enable the children to develop skills in managing funds and balancing purchase without the need to carry cash.

Further, in additional aspects, a parent may provide loaded multicards to children attending colleges, foreign study programs, or internships, and the children may activate the loaded multicards to access the funds using any of the techniques described above. For example, the disclosed embodiments may be configured to allow parents may provide children with discrete allotments of funds without obtaining and holding large amounts of cash, and further, in a manner that provides the children with freedom to access and spend the funds at will.

In other aspects, user 110 may purchase inactive and unfunded multicards (e.g., a pack of ten multicards) from a retailer or a financial institution in anticipation of domestic and/or international travel. In some embodiments, user 110 may access a graphical user interface (GUI) presented by client device 104 to request that system 140 validate, load, and activate one or more of the purchased multicards using the techniques described above prior to departing on a scheduled trip, or alternatively, upon arrival at a destination. For example, user 110 may, through client device 104, request that system 140 load the one or more inactive multicards with funds in a currency associated with the destination, and user 110 may then use the activated and loaded multicards to make purchases of goods and services while travelling at the destination. For example, user 110 may, through client device 104, request that system 140 validate, load, and/or activate the inactive multicards immediately after purchase, or at any time prior to or during travel (e.g., days, weeks, or months later). Further, one or more of user 110 or a recipient of the loaded and/or activated multicards may, through client device 104 (or a similar client device), request that system 140 reload the one or more of the multicards using any of the processes outlined above.

Further, in some aspects, as described above, user 110 (and additionally or alternatively, a recipient) may request that system 140 load and/or reload one or more of the multicards with funds denominated not only in their home currency, but also in the currency of the destination. For example, the disclosed embodiments may be configured to enable user 110 to purchase goods and services using the activated multicards without revealing any personal financial information (e.g., as would be required when user a personal credit card of user 110), and further, without the need to carry multiple currencies in what could be an unfamiliar environment.

In other aspects, user 110 may purchase one or more inactive multicards upon arrival at the destination. By way of example, system 140 (and additionally or alternatively, client device 104 and system 150) may validate and subsequently load the inactive multicards with a multicard account balance denominated in the currency of the destination, thus eliminating the need to time-consuming and costly currency conversion.

Further, for example, system 140 may receive a request from user 110 to load the inactive multicards with multicard account balances denominated in various currencies. For example, user 110 may plan visits to Japan, China, and South Korea in a single business trip. For example, and prior to travelling, user 110 may access a graphical user interface (GUI) at client device 104 to specify that a first subset of the inactive multicards be loaded with Japanese yen, a second subset of the inactive multicards be loaded with Chinese renminbi, and that a third subset of the inactive multicards be loaded with South Korean won. User 110 may, for example, travel between Japan, China, and South Korea without collecting and exchanging multiple national currencies.

Further, the disclosed embodiments may enable user 110 to load the inactive and unfunded multicards with foreign currencies at times prior to travel associated with favorable conversion rates. For example, system 140 may receive a request from user 110 may validate and load of the inactive and unfunded multicards with Japanese yen at a time prior to travel when the conversion rates between U.S. dollars and Japanese yen are especially favorable. User 110 may, for example, request that system 140 adaptively load one or more of the unfunded and inactive multicards at times that reduce losses of capital due to unfavorable currency conversion.

In some aspects, user 110 may use prepaid multicards to protect personal financial information during purchases of goods and services from online retailers. For example, and as described above, user 110 may purchase one or more inactive and unfunded multicards (e.g., a pack of ten multicards) from a merchant or a financial institution, and may request, through client device 103, that system 140 validate, load, and activate the purchased multicards using one or more of the techniques described above. In certain aspects, user 110 may use one or more of the activated multicards to make purchases of goods and services at electronic, web-based retailers without revealing personal financial information associated with a personal financial instrument, such as a personal credit or debit card. Further, for example, user 110 also maintains an ability to use the loaded and activated multicards to make purchases from one or more physical retailers, to deposit corresponding funds into an account held by user 110, or to convert the loaded funds into cash at an ATM machine. Additionally, user 110 may request, using client device 104, that system 140 reload one or more of the multicards with additional funds using the processes described above.

Further, in other aspects, a business entity (e.g., business entity 160) may rely on prepaid multicards to provide allowance, incentives, and gifts to employees, and additionally or alternatively, as a mechanism to cover or reimburse expenses incurred by the employees. For example, a representative of the business entity (e.g., a manager of a company, etc.) may purchase one or more inactive and unfunded multicards (e.g., a pack of ten multicards) from a merchant or a financial institution, and may, through client device 104, request that system 140 validate, load, and activate the purchased multicards using one or more of the techniques described above. For example, the manager may request that system 140 validate, load, and activate one or more of the purchased multicards immediately in response to a specific need, or may hold the purchased cards for days, weeks, or months to accommodate an expected future need.

In certain aspects, the manager may provide an employee with a loaded and activated multicard as an allowance, a gift, or to fund an anticipated expense. The employee may, for example, use the prepaid and activated multicards in a manner set forth by the business entity (e.g., to cover an anticipated expense), or alternatively, may use the prepaid and activated multicard to make purchases, deposit funds, or to obtain cash, as outlined above. Further, in some aspects, system 140 may reload the multicards with additional funds at the discretion or request of the purchasing business entity using any of the techniques described above.

In additional embodiments, a representative of a business entity may purchase one or more inactive and unfunded multicards (e.g., a pack of ten multicards) from a merchant or a financial institution, At the request of a customer of the business entity (e.g., user 110), the representative or other authorized individual may, through a client device, request that system 140 validate, load, and activate one or more of the purchased multicards using any of the techniques outlined above. The activated and funded multicards may, for example, include information identifying the business entity (e.g., a logo, etc.) or identifying a payment network associated with the prepaid multicard (e.g., Visa™). By way of example, the business entity may provide the activated and loaded multicard to user 110 for general use (e.g., for purchase of goods and services, to deposit corresponding funds into one of their accounts, or to convert the loaded funds into cash at an ATM machine). In certain aspects, representative of the business entity may, through the client device, request that system 140 reload one or more of the multicards using additional funds provided by user 110, and additionally or alternatively through a refund associated with returned goods. Further, in other aspects, the business entity may charge user 110 a fee for the convenience of reloading the one or more multicards, which the business entity may deduct from a multicard account balance associated with the reloaded multicard or multicards. In other aspects, user 110 may reload one or more of the multicards using any of the techniques outlined above.

In the embodiments described above, user 110 may purchase a package that includes multiple inactive multicards (e.g., ten cards). In certain aspects, user 110 may, through client device 104, request that system 140 validate, fund, and activate a single one of the multiple inactive cards, or alternatively, a subset of the packed inactive multicards, using the techniques described above. In some embodiments, the inactive and unfunded multicards within the purchased package may not be linked together, and as such, system 140 validate, fund, and activate the inactive and unfunded multicards individually or in any combination or grouping apparent to, appropriate to, and desired by user 110.

The disclosed embodiments may also be configured to allow inactivated or activated multicards to be customized visually. For example, in certain embodiments, a multicard may be formatted on one or more surfaces with text, graphics, images, etc. specified by user 110 or a user associated with an activated multicard (e.g., a recipient of the multicard from user 110). In one embodiment, one or more components of computing environment 100 may execute software instructions to provide for customization of multicard 106, e.g., through a corresponding interface presented to user 110 by client device 104. For example, client device 104, system 140, system 150, or another system may include a multicard customization module that may perform multicard customization operations consistent with disclosed embodiments. In some instances, the customization of a multicard may include printing indicia representing a payment network (e.g., Visa™), a logo of a retailer or merchant, and or one or more decorative elements on a surface of a multicard.

Figure 5A:
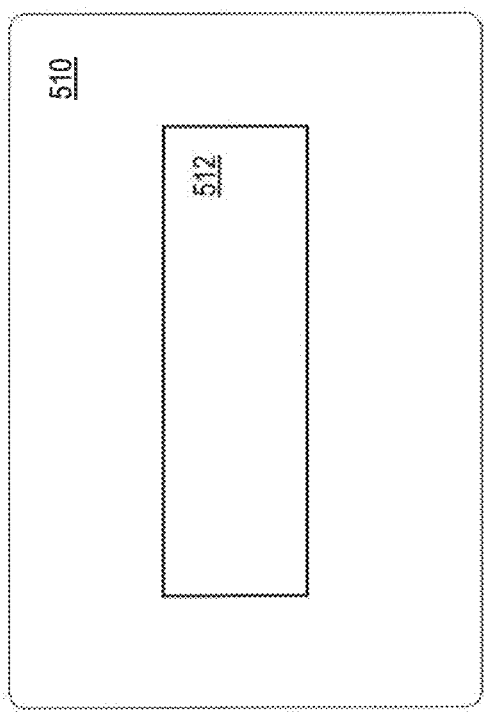
FIGS. 5A and 5B illustrate an exemplary muiticard consistent with disclosed embodiments.
Figure 5B:
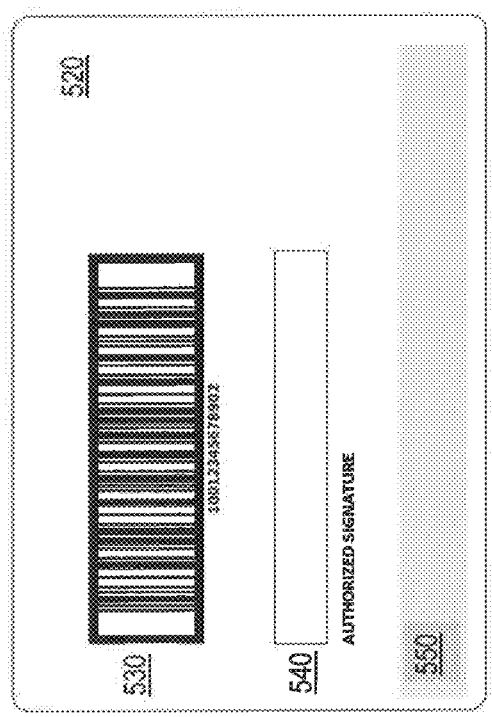

FIGS. 5A and 5B illustrate surfaces of an exemplary multicard 500, consistent with the disclosed embodiments. In FIGS. 5A and 5B, multicard 500 may corresponding to an unfunded inactive multicard, a funded inactive multicard, and additionally or alternatively, a fully funded and activated multicard, as described above. For example, multicard 500 may be a physical multicard resembling a network credit card (in size and shape) similar to the type issued by Visa™, Mastercard™, American Express™, Discover™ and/or the like. In some aspects, first surface 510 may include visual content 512 (e.g., a logo) corresponding to a payment network (e.g., Visa™, Mastercard™, American Express™, Discover™ and/or the like), a retailer or merchant, and or one or more decorative elements (e.g., a bow). Further, multicard 500 may be constructed of plastic, metal, paper, or some other material similar to that used to construct such network credit cards, and may be generally rectangular.

In additional embodiments, multicard 500 may correspond to an electronic multicard provided to client device 104 in electronic form (e.g., without a physical card purchased from a retailer). For example, system 140 may provide electronic multicard 500 to client device 104 as an encrypted file delivered to a recipient's electronic device via email, or via an internet link provided to the recipient. In one aspect, one account number or a group of account numbers may be purchased for a small nominal amount via online transaction. Similar to inactivated and unfunded physical multicards, the purchased account numbers remain unusable for any purpose until user 110 activates one or more of the accounts via the aforementioned methods and systems for multicard funding and activation. Accordingly, the activated electronic multicard may be presented by the recipient to a merchant for a purchase via a portable electronic device (e.g., client device 104). In some aspects, the merchant may scan a barcode displayed on the electronic multicard displayed on client device 104, or transfer the electronic multicard to a merchant device (e.g., POS 156) via RFID or by some other electronic method known in the art.

In other embodiments, user 110 may print an image of the electronic multicard (e.g., on a home printer communicating with client device 104 through a corresponding wired or wireless connection), and may present the printed image to a merchant to complete a purchase of a corresponding good or service. For example, the printed image of the electronic multicard may include an image of a machine-readable barcode and/or alphanumeric human-readable numbers that uniquely identify the electronic multicard and facilitate processing of a corresponding transaction.

Additionally, in some embodiments, system 140 may track the activation of electronic multicards associated with corresponding ones of the purchased group of account numbers. In certain aspects, when user 110 validates, loads, and activates greater than a threshold number of the purchased account numbers, system 140 may issue another set of account numbers to user 110 and charge user 110 the nominal amount via online transaction. In certain aspects, system 140 may issue the additional set of accounts numbers automatically and without intervention from user 110, or alternatively, may issue the additional set of account numbers upon receipt of confirmation from user 110 (e.g., through client device 104).

In certain aspects, system 140 ensures that user 110 maintains an adequate supply of account numbers, which user 110 may convert into corresponding electronic multicards, as described above. Further, in other embodiments, system 110 may issue an additional group of physical multicards to user 110 when user 110 validates, loads, and activates greater than a threshold number of the purchased account numbers (or a threshold number of previously purchased physical multicards). For example, system 110 may forward the additional group of physical multicards to a mailing address associated with a payment instrument provided by user 110 to purchase of the group of physical multicards.

FIG. 5B shows an exemplary second surface 520 of exemplary multicard 500. According to one embodiment, multicard surface 520 may include a machine-readable barcode 530. Additionally or alternatively, multicard surface 520 may contain alphanumeric human-readable numbers that uniquely identify the card. Multicard surface 520 may also include a magnetic strip 550 that may be readable by a magnetic card reader (not shown). According to some embodiments, multicard 500 may be configured for issuance to a specific recipient. In certain aspects, multicard surface 520 may, in addition to or alternatively, include an area 540 to allow the intended recipient to sign the face of the card. According to other embodiments, some or all of the described features of multicard 500 as shown in FIGS. 5A and 5B may be present, in any combination.

Other embodiments will be apparent to those skilled in the art from consideration of the specification and practice of the embodiments disclosed herein. It is intended that the specification and examples be considered as exemplary only, with a true scope and spirit of the disclosed embodiments being indicated by the following claims.

What is claimed is:

1. A computer-implemented method, comprising:
receiving, by one or more processors, first multicard configuration information associated with a first inactivated multicard, the first multicard configuration information including a multicard identifier that identifies the first inactivated multicard and a first multicard account balance amount for the first inactivated multicard;
validating, by the one or more processors, the first inactivated multicard using the multicard identifier;
generating and storing, by the one or more processors, and within a storage device, data characterizing a first multicard account associated with the first inactivated multicard, the first multicard account data associating the first multicard account with funds corresponding to the first multicard account balance amount;
generating and transmitting, by the one or more processors, a first multicard funding confirmation to a first device, the first multicard funding confirmation indicating a funding of the first multicard account in accordance with the first multicard account balance;
based on the first multicard account data, determining, by the one or more processors, that a number of activated multicards associated with the first multicard account exceeds a threshold number;
when the number of activated multicards exceeds the threshold value, generating and transmitting, by the one or more processors, additional multicard data identifying one or more second inactivated multicards to the first device;
receiving, by the one or more processors, a request from a second device to activate the first inactivated multicard;
in response to the received request, performing, by the one or more processors, operations that activate the first inactivated multicard for purchases based on the first multicard balance amount; and
generating and transmitting, by the one or more processors, an activation confirmation to the second device, the activation confirmation being indicative of the activation of the first inactivated multicard, and the activation confirmation comprising information that causes an application program executed by the second device to generate and present a representation of the activation confirmation on a digital interface.

2. The method of claim 1, wherein:
the first multicard configuration information identifies a first currency denominating the first multicard account balance amount; and
the first multicard funding confirmation confirms the denomination of the first multicard account balance amount in the first currency.

3. The method of claim 1, further comprising:
receiving, by the one or more processors, second multicard configuration information from the first device, the second multicard configuration information comprising (i) second multicard identifiers associated with the one or more second inactivated multicards, and (ii) second multicard account balance amounts associated with the one or more second inactivated multicards;
by the one or more processors, generating and storing, within the storage device, data characterizing a second multicard account associated with each of the one or more second invalidated multicards, the second multicard accounts being funded in accordance with corresponding ones of the second multicard account balance amounts; and
generating and transmitting, by the one or more processors, a second multicard funding confirmation to the first device, the second first multicard funding confirmation indicates that the second inactivated multicards are configured with the second multicard account balance amounts such that the second inactivated multicards are usable, when activated, for purchases based on the second multicard account balance amounts.

4. The method of claim 1, further comprising:
obtaining, by the one or more processors, second multicard configuration information comprising the multicard identifier and a second multicard account balance amount;
modifying, by the one or more processors, the first multicard account data to associate the first multicard account with funds corresponding to the second multicard account balance amount; and
generating and transmitting, by the one or more processors, a second multicard funding confirmation to the first device, the second multicard funding confirmation being indicative of a reloading of the first inactivated multicard with the second multicard account balance amount such that the first inactivated multicard is usable, when activated, for purchases based on the second multicard account balance.

5. The method of claim 1, further comprising:
receiving, by the one or more processors, identification information from the first device, the identification information identifying a user associated with the second device; and
storing, by the one or more processors, a portion of the identification information within the storage device, the stored portion of the identification information associating the user of the second device with the first multicard account.

6. A system, comprising:
a communications unit;
a storage device; and
at least one processor coupled to the communications unit and the storage device, the storage device storing software instructions for controlling the at least one processor when executed by the at least one processor, the at least one processor being operative with the software instructions and being configured to:
receive, via the communications unit, first multicard configuration information associated with a first inactivated multicard, the first multicard configuration information including a unique multicard identifier that identifies the first inactivated multicard and a first multicard account balance amount for the first inactivated multicard;
validate the first inactivated multicard using the unique multicard identifier;
generate and store, within the storage device, data characterizing a first multicard account associated with the first inactivated multicard, the first multicard account data associating the first multicard account with funds corresponding to the first multicard account balance amount;
generate and transmit, via the communications unit, a first multicard funding confirmation to a first device, the first multicard funding confirmation indicating a funding of the first inactivated multicard in accordance with the first multicard account balance amount;
based on the first multicard account data, determine that a number of activated multicards associated with the first multicard account exceeds a threshold number;
when the number of activated multicards exceeds the threshold value, generate and transmit additional multicard data identifying one or more second inactivated multicards to the first device;
receive, via the communications unit, a request to activate the first inactivated multicard from a second device;
in response to the received request, perform operations that activate the first inactivated multicard for purchases based on the first multicard balance amount; and
generate and transmit, via the communications unit, an activation confirmation to the second device, the activation confirmation being indicative of the activation of the first inactivated multicard, and the activation confirmation comprising information that causes an application program executed by the second device to generate and present a representation of the activation confirmation on a digital interface.

7. The system of claim 6, wherein the at least one processor is further configured to:
receive, via the communications unit authentication information identifying a user associated with the first device;
authenticate an identity of the first user based on the authentication information;
based on the authenticated identity, access and load, from the storage unit, account data characterizing a financial account associated with the user; and
perform operations that fund the first multicard account balance amount from the financial account associated with the first user.

8. The system of claim 6, wherein:
the first multicard configuration information identifies a first currency denominating the first multicard account balance amount; and
the first multicard funding confirmation confirms the denomination of the first multicard account balance amount in the first currency.

9. The system of claim 6, wherein the at least one processor is further configured to:
receive, via the communications unit, second multicard confirmation information from the first device, the second multicard configuration information comprising (i) second multicard identifiers associated with a plurality of second inactivated multicards, and (ii) second multicard account balance amounts associated with the second inactivated multicards;
generate and store, within the storage device, data characterizing a second multicard account associated with each of the one or more second invalidated multicards, the second multicard accounts being funded in accordance with having corresponding ones of the second multicard account balance amounts; and
generating and transmitting, via the communication unit, a second multicard funding confirmation to the first device, the second funding confirmation indicating that the second inactivated multicards are configured with the second multicard account balance amounts such that the second inactivated multicards are usable, when activated, for purchases based on the second multicard account balance amounts.

10. The system of claim 6, wherein the at least one processor is further configured to:
identify a purchase incentive associated with at least one a user of the first device or the first multicard account; and
associate the identified purchase incentive with the first inactivated multicard, the identified purchase incentive being linked to a purchase using the first multicard account balance amount at a predetermined merchant.

11. The system of claim 6, wherein the at least one processor is further configured to:
obtain second multicard configuration information comprising the multicard identifier and a second multicard account balance amount;
modify the first multicard account data to associate the first multicard account of with funds corresponding to the second multicard account balance amount; and
generate and transmit, via the communications unit, a second multicard funding confirmation to the first device, the second multicard funding confirmation being indicative of a reloading of the first inactivated multicard with the second multicard account balance amount such that the first inactivated multicard is usable, when activated, for purchases based on the second multicard account balance.

12. The system of claim 6, wherein the at least one processor is further configured to:
- receive, via the communications unit, identification information from the first device, the identification information identifying a user associated with a second device; and
- store a portion of the identification information within the storage device, the stored portions of the identification information.

13. The system of claim 6, wherein:
- the first multicard configuration information comprises digital image data, the digital image data being captured by a digital camera included within the first device, and the digital image data comprising a machine readable code representative of the multicard identifier; and
- the at least one processor is further configured to:
  - process the digital image data to identify the machine readable code; and
  - determine the multicard identifier based on the machine readable code.

14. The system of claim 6, wherein:
- the activation confirmation comprises a machine readable code representative of the first multicard account; and
- the activation confirmation further comprises information that causes an application program executed by the second device to generate and present a representation of the machine readable code on a corresponding interface.

15. The system of claim 6, wherein the first multicard funding confirmation comprises additional information that causes an application program executed by the first device to generate and present a representation of the first multicard funding confirmation on a corresponding digital interface.

16. The system of claim 6, wherein the at least one processor is further configured to:
- determine that a balance of the funds associated with the first multicard account fails to exceed a threshold balance; and
- when the determined balance fails to exceed the threshold balance, perform operations that de-activate the first activated multicard for additional purchases.

17. The system of claim 16, wherein the at least one processor is further configured to generate and transmit, via the communications unit, a de-activation confirmation to at least one of the first device or the second device, the de-activation confirmation confirming the de-activation of the first activated multicard.

18. A tangible, non-transitory computer-readable medium storing instructions that, when executed by at least one processor, cause the at least one processor to perform a method, comprising:
- receiving first multicard configuration information associated with a first inactivated multicard, the first multicard configuration information including a multicard identifier that identifies the first inactivated multicard and a first multicard account balance amount for the first inactivated multicard;
- validating the first inactivated multicard using the unique multicard identifier;
- generating and storing, within a storage device, data characterizing a first multicard account associated with the first inactivated multicard, the first multicard account data associating the first multicard account with funds corresponding to the first multicard account balance amount;
- generating and transmitting a first multicard funding confirmation to a first device associated with the first inactivated multicard, the first multicard funding confirmation indicating a funding of the first multicard account in accordance with the first multicard account balance;
- based on the first multicard account data, determining that a number of activated multicards associated with the first multicard account exceeds a threshold number;
- when the number of activated multicards exceeds the threshold value, generating and transmitting additional multicard data identifying one or more second inactivated multicards to the first device;
- receiving a request to activate the first inactivated multicard from a second device;
- in response to the received request, performing operations that activate the first inactivated multicard for purchases based on the first multicard balance amount; and
- generating and transmitting an activation confirmation to the second device, the activation confirmation being indicative of the activation of the first inactivated multicard, and the activation confirmation comprising information that causes an application program executed by the second device to generate and present a representation of the activation confirmation on a digital interface.

* * * * *